Figure 1:
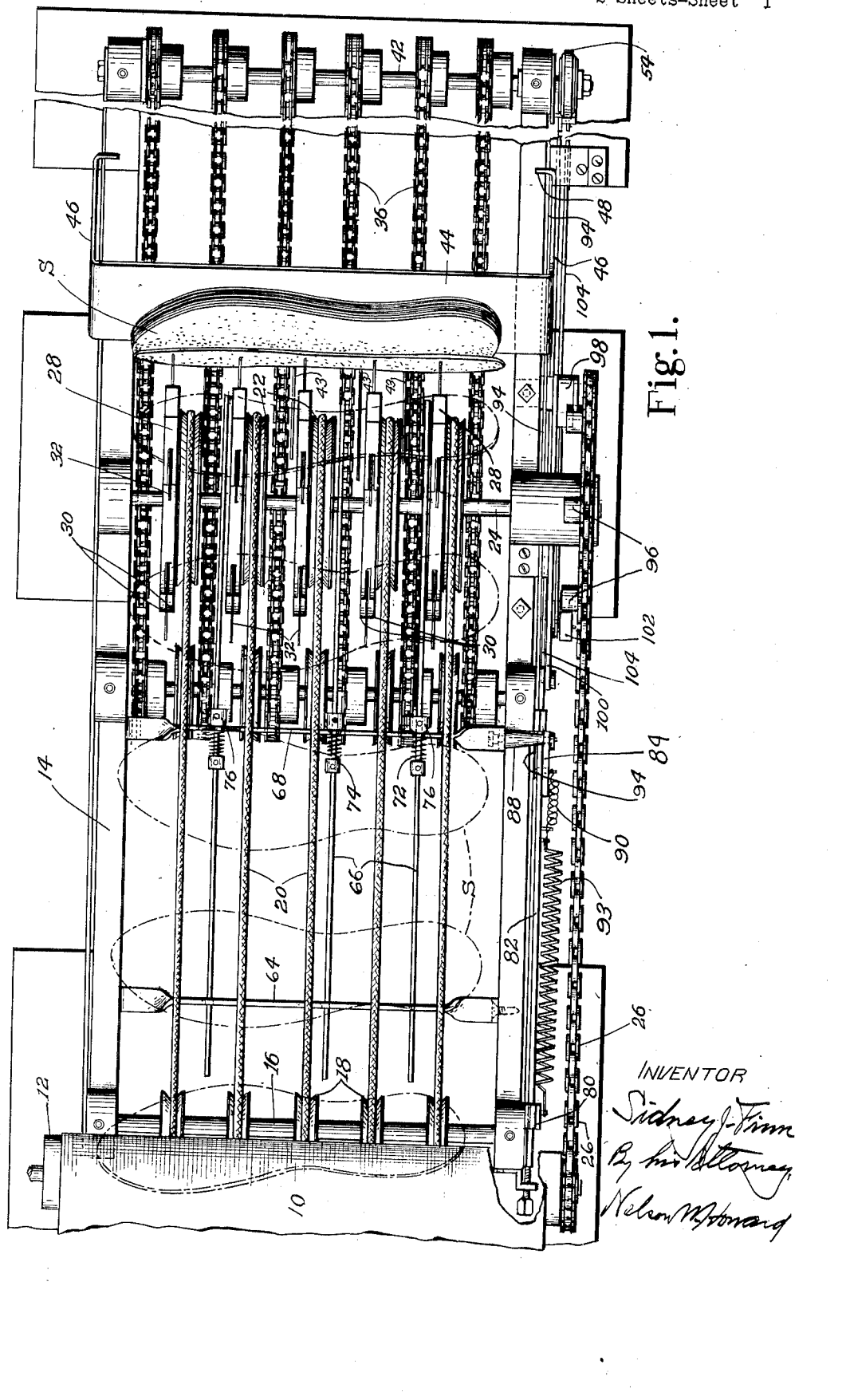

Feb. 23, 1932.  S. J. FINN  1,846,324
STACKING APPARATUS
Filed Jan. 5, 1927  2 Sheets-Sheet 1

INVENTOR

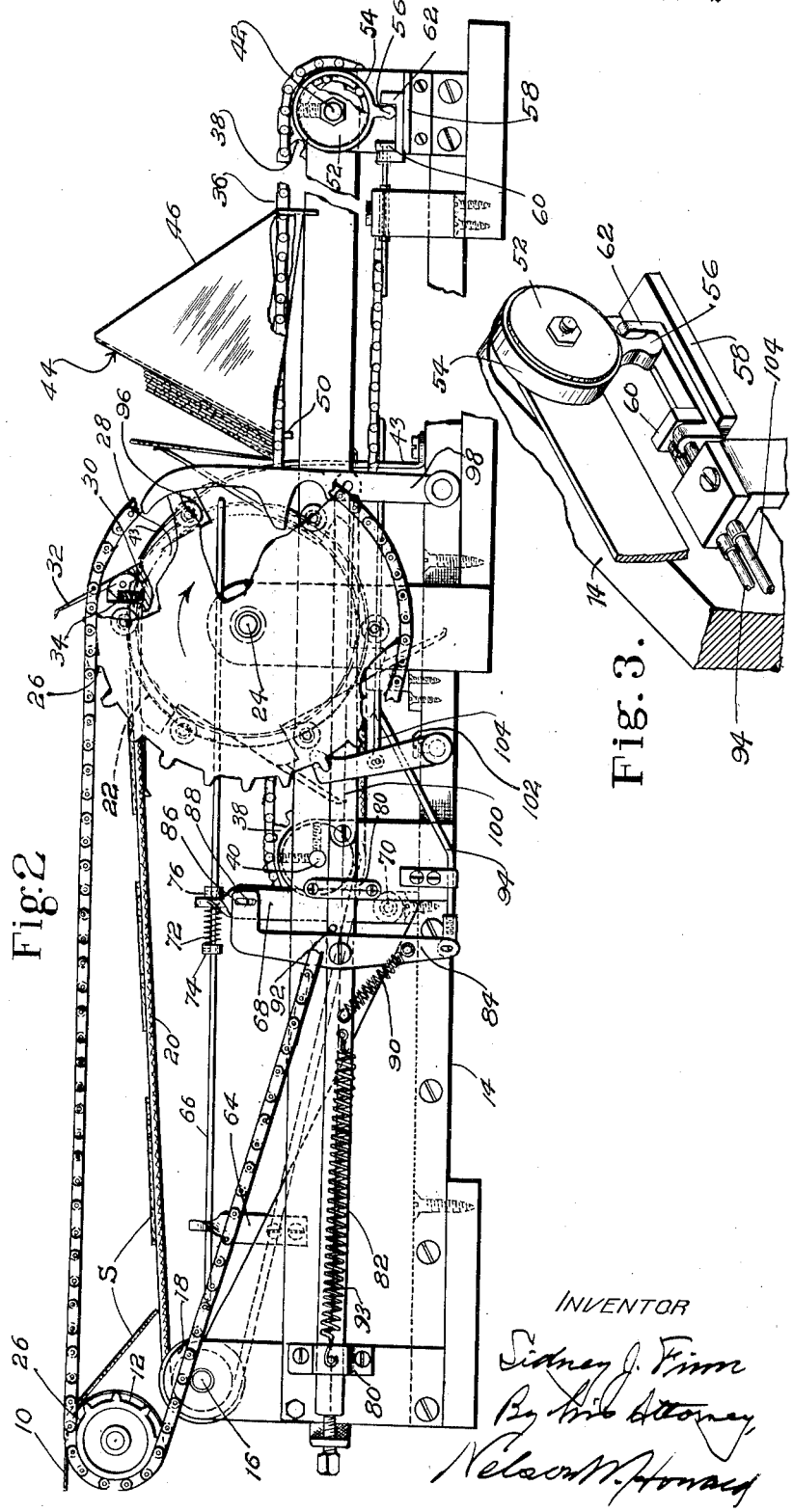

Patented Feb. 23, 1932

1,846,324

UNITED STATES PATENT OFFICE

SIDNEY J. FINN, OF BEVERLY, MASSACHUSETTS, ASSIGNOR TO UNITED SHOE MACHINERY CORPORATION, OF PATERSON, NEW JERSEY, A CORPORATION OF NEW JERSEY

STACKING APPARATUS

Application filed January 5, 1927. Serial No. 159,134.

My invention relates to apparatus for stacking, or effecting the arrangement in an orderly series, of such articles as portions of rubber or other types of shoes.

In the manufacture of rubber shoes, the insoles, after being coated upon one side with cement, are placed upon a long conveyor to partially dry said cement, and are collected one by one at the delivery-end of the conveyor in groups of a suitable number to be supplied to operatives who perform the succeeding operation. This collection from the conveyor requires constant attention, and an object of the present invention is to provide for the effective stacking of the delivered articles, the attendant having only to dispose of a stacked series when the desired number has accumulated.

As a feature of the invention leading to the accomplishment of this object, I combine with means for advancing articles in a generally horizontal plane, means, as a series of fingers or like members, movable one after another into such plane for engaging the advanced articles and stacking them upon their edges, as on a movable support, with which is associated means for moving it. In this way, cemented insoles may be received in their direction of travel upon the drying conveyor, and assembled in any convenient number without exerting even the pressure of the articles themselves upon one another, which might cause the coated surfaces to adhere to those adjacent. They are also conveniently arranged for removal in groups. The delivery of the articles, which may be both from and to a conveyor, is preferably against an abutment rising from the receiving support. To allow this abutment to be positioned readily upon its conveyor to best co-operate with the articles delivered to it, retaining means is shown herein, which may consist of a projection upon the abutment adapted to enter the links of a chain-conveyor. The means for delivering to the abutment I have shown as consisting of revoluble fingers, which I prefer to make yieldable. By this arrangement, articles engaged by the fingers so near their ends that they cannot be elevated properly, may be freed as a result of the yield and left for engagement by the fingers next acting, instead of being partially raised and dropped back in positions from which they cannot be delivered.

To permit the delivering means to act in the correct relation to the conveyor with its abutment or other receiving member, as another feature of the invention, this receiving member is made movable under the influence of means governed by the delivered articles. In this way, movement may be produced in proportion to the accumulation of articles, so that the exact space necessary for the best stacking action is constantly maintained. To reduce the pressure exerted upon the contacting coated articles, the movement of the receiving member is preferably effected from power mechanism, the control exerted upon this mechanism by the articles being through testing means, as a movable measuring member, which gages the stack and thereby determines the action of the power mechanism upon the abutment or receiving member. The particular organization herein disclosed for thus adjusting the receiving member combines with means for delivering articles, a clutch, which is set by the measuring member under the power of the delivering means in accordance with the number of articles in place or the longitudinal dimension of the stack, and which is then actuated by connections to the delivering means in accordance with this setting to produce the desired alteration in the receiving member.

As illustrative of my invention, the accompanying drawings present an apparatus in which Fig. 1 shows as a broken top plan;

Fig. 2, a broken side elevation; and

Fig. 3, a perspective of the clutch mechanism.

The delivery-end of a drying conveyor 10 is supported upon a roll 12 driven from a source of power (not shown). In a frame 14 adjacent to and below the conveyor 10 rotates a horizontal shaft 16 carrying a series of spaced pulleys 18 guiding conveyor-belts 20, which extend in a generally horizontal direction over pulleys 22 on a shaft 24 journaled in the frame parallel to the shaft 16. Rotation may be imparted to the shaft 24, and the belts 20 thereby caused to advance the insoles S or other work-pieces carried upon their upper runs, through sprocket-gearing 26 from the roll 12. Secured upon the shaft 24, being equidistant from each other, are carrier-disks 28, about the peripheries of which are located pairs of spaced cheeks 30. Between each pair of cheeks is pivotally mounted a finger 32, held yieldably in a position substantially tangential to the periphery of the disk by a spring 34 located between its pivotal mounting and a depression in the adjacent edge of the disk. As the fingers of each transverse series rise between the belts 20 of the delivering conveyor, they lift therefrom the insoles which have been discharged from the conveyor 10, and transfer them to a support in the form of a receiving conveyor. If the engagement of the fingers with the insoles is such as to with certainty elevate them, the weight is applied so near the pivotal points of the fingers that these do not yield. On the other hand, if the fingers contact near their ends with the insoles so that they might fall rearwardly therefrom and assume positions upon the belts 20 from which they could not be raised, the springs 34 yield, leaving the articles upon the belts to receive the elevating engagement of the succeeding series of fingers. Further, since the ends of the fingers are more remote from the axis of the shaft 24 than are the belts 20, the former travel at a greater velocity. Therefore, when the articles are near the ends of the fingers as these rise, said fingers are drawn from beneath the articles, so the proper action of the following fingers is assured. As illustrated, the receiving conveyor consists of a plurality of generally horizontally extending chains 36, a portion of the runs of which lie between pairs of the pulleys 22 and disks 30, they operating over supports furnished by sprocket-wheels 38 arranged in opposite series upon an inner shaft 40 and an outer shaft 42 journaled upon the frame. As the fingers bearing the insoles descend between the chains, they deposit said insoles with their forward edges upon the chains and occupying approximately vertical positions. They are prevented from tipping rearwardly upon delivery, and are guided in their descent, by curved members 43 furnished by wires extending between certain of the disks 28. To retain the insoles thus supported upon their edges on the chains, they rest against an abutment-surface 44, which may be slightly inclined outwardly from the vertical to prevent them from tilting in the opposite direction. The abutment surface is upon a yoke having side supporting arms 46, 46 situated beyond the outer chains 36 and provided with inturned end portions 48 resting upon the top of the side bars of the frame and thus serving to guide the yoke as the chains travel. Depending from the cross-wall of the yoke are retaining projections 50, conveniently two in number, which are adapted to enter between the links of the chains and thus hold the abutment-surface 70 in any desired initial relation to the delivering point of the transferring fingers. The location of the abutment member may readily be altered by lifting the yoke and depositing it with the projections in engagement with any of the links of the upper runs of the chains.

If the abutment is initially located upon the chains to most effectively receive the delivered insoles, it must be moved away from the delivering device by substantially the thickness of an insole after each delivery. This is accurately accomplished, and with a minimum pressure upon the stacked articles, by the mechanism which will now be descibed. The shaft 42 carries a connecting device, which may be in the form of a Horton clutch, having a driven member 52 fast upon the shaft and a driving member 54, normally loose but frictionally engaging the driven member to rotate it when turned in a clockwise direction, as viewed in Fig. 2 of the drawings. Depending from the periphery of the driving member 54 is a projection 56. Beneath the projection is a guide-bracket 58, over which is movable, at the inner side of the projection, a setting member 60, while at the outer side is an actuating member 62. These members respectively first rotate the driving member 54 idly in one direction to a position determined by testing mechanism operable with the delivering fingers to an extent depending upon the thickness of the stack against the abutment, and then turn said driving member in the opposite direction to rotate the driven member 52, and thereby cause the travel of the chains in accordance with the just-indicated setting.

To measure the stack and govern the clutch device, there are mounted to reciprocate horizontally through a transversely extending bracket 64, rods 66, of which three are shown, spaced from one another across the conveyor-belts 20. These three rods insure proper co-operation with the stack, whatever the size of the insoles which make it up. The forward extremities of the rods extend into proximity with the plane of delivery of the fingers 32, and are guided for reciprocation through the bracket 64 by a yoke 68 pivoted at 70 upon the frame. To compensate for the movement of the joint between the yoke and rods out of a horizontal plane, they are yieldably connected by a spring 72 surrounding each rod and seated against a collar 74 fast thereon, the opposite extremity of the spring forcing the cross-bar of the yoke 68 against the rounded end of a second fast collar 76. Movable at one side of the frame, in brackets 80, 80, is a slide 82, upon which is fulcrumed a lever 84. Through a vertical slot 86 in a forward extension of the upper portion of the lever passes a horizontal projection 88 from the adjacent side of the yoke 68. A spring 90, connecting the slide with the lever below its fulcrum, holds said lever normally against a pin 92 projecting from the slide. This slide, and therefore the lever 84 and rods 66, are normally maintained at the outward extreme of travel of the rods from the stacked soles by a spring 93 connected to the slide and to such a fixed point as one of the brackets. The lower end of the lever 84 is joined by a slot-and-pin connection to a rod 94, which is fixed at its outer extremity to the clutch-setting member 60. After each delivery of an insole to the stack by one of the series of fingers 32, slide 82 is moved from its resting position for a definite distance to the right (Fig. 2). This is accomplished by some one of a series of projections 96 carried upon the inner face of the sprocket-wheel of gearing 26 which is secured to the shaft 24. These projections correspond in their spacing about the sprocket to that of the fingers 32. The actuating effect of the projection is transmitted to the slide 82 by contact of the projection with an inclined surface upon a lever 98 pivoted upon the frame, and joined by a link 100 to the slide. As the slide travels, it carries with it the lever 84, the first part of this movement being idle, the member 60 not having reached the clutch-projection 56. But when the forward extremities of the rods 66 arrive at the point at which space should exist for the deposit of the next insole to be stacked, the member 60 will be in proximity to the clutch-projection. If at or before this time the rods encounter the surface of the outer article of the stack, their progress will be arrested, and then not only will the travel of the slide continue, but the lever 84 will now be tilted upon said slide, moving its lower end toward the clutch against the tension of the spring 90. This through the member 60, rotates the driving member 54 of the clutch in an anti-clockwise direction, through an angle governed by the extent to which the stack reaches beyond the desired point. This testing mechanism is then released by the passage of the projection 96 past the contact-face of the lever 98 and returned to its initial position by the spring 93. Immediately after this, one of the series of projections 96 contacts with an inclined surface upon a lever 102 fulcrumed upon the frame. The lever is thereby swung through a definite angle by the power thus applied, and, by a connecting rod 104, carries the actuating member 62 against the clutch-projection 56. The driving member 54 will consequently be rotated through an angle determined by the previous setting of the projection by the member 60 under the influence of the stack-testing rods. Frictional engagement of the connecting device in the clutch will consequently turn the driven member 52 and the shaft 42, advancing the conveyor-chains 36 and locating the receiving face of the stack at the proper point.

To briefly outline the operation of the apparatus, cemented insoles S are delivered by the drying conveyor 10 to the upper runs of the belts 20, and, when each insole arrives at the transferring device, it is lifted by a series of fingers 32 if the points of engagement with said fingers are correct. Otherwise, the fingers yield, leaving the insole upon the belts for engagement by the succeeding series. Carried forward and downward by the fingers, each insole is deposited upon its edge on the receiving chains 36 and tilted forward against the abutment-surface 44, the fingers which transferred the article yielding as they leave it and passing below the chains. Upon this delivery, the power-driven projection 96 corresponding to the fingers which have acted engages the lever 98 to advance the testing rods 66 in timed relation with said fingers through the slide 82 and lever 84. If the stack has not accumulated to an extent which makes more room between it and the delivering device necessary, the testing operation produces no effect upon the abutment. But, if the fingers encounter the outer surface of the stacked insole, their advance is stopped, swinging the lever in an anti-clockwise direction upon the slide, and producing a setting of the clutch member 54 through an angle proportionate to the desired amount of movement of the abutment away from the delivering device. This setting having been accomplished, another projection 96 in the series tilts the lever 102, causing the member 62 to rotate the clutch-portion 54 oppositely to its setting movement, and thus advancing the chains 36 with the abutment to correspond to the setting which resulted from the stack-measuring operation. When a stack of the desired magnitude has gathered, the attendant may place another abutment in receiving position, and, at his convenience, remove the completed stack as its gradual advance by the chains continues.

Having described my invention, what I claim as new and desire to secure by Letters Patent of the United States is:

1. The combination with means for advancing articles in a generally horizontal plane, of a series of members movable one after another into such plane and arranged to engage the advancing articles and stack them upon their edges, a movable support upon which the articles are thus stacked, and means for moving the support.

2. The combination with spaced conveyors for delivering articles, of rotatable disks, article-transferring projections from the disks revoluble between the conveyors, and a support for the articles below which support the projections descend in their delivering movement.

3. The combination with a delivering member, of a receiving member, an abutment rising from the receiving member, and means arranged to engage articles upon the delivering member and place them against the abutment.

4. The combination with a delivering conveyor, of a receiving conveyor, an abutment rising from the receiving conveyor, and means arranged to engage articles upon the delivering conveyor and place them upon their edges on the receiving conveyor against the abutment.

5. The combination with spaced conveyors, of yieldable fingers revoluble between the conveyors, and a receiving abutment against which the fingers transfer articles from the conveyor.

6. In a stacking apparatus, spaced conveyors, a carrier-disk rotatable between the conveyors, and a finger projecting from the carrier-disk and being yieldable under the weight of the articles to be stacked when contacting with them near the outer extremity of said finger.

7. The combination with a delivering conveyor, of a receiving conveyor, an abutment having a retaining device arranged to engage the receiving conveyor, and means for transferring articles from the delivering conveyor against the abutment.

8. The combination with a delivering conveyor, of a receiving conveyor including carrier-chains, an abutment having projections constructed and arranged to enter links of the chains and retain the abutment in various positions thereon, and means for transferring articles from the delivering conveyor against the abutment upon the receiving conveyor.

9. The combination with an endless conveyor having an abutment, of means for delivering articles to the conveyor, and means governed in its operation by the delivered articles for moving the conveyor.

10. The combination with a movable receiving member, of means for delivering articles to the receiving member, power mechanism for moving the receiving member, said mechanism being normally ineffective to produce such movement, and means governed by the delivered articles for connecting the power mechanism to the receiving member.

11. The combination with a movable receiving member, of means for delivering articles to the receiving member, a member movable toward each article after its delivery, power mechanism normally disconnected from the receiving member, and means governed by the contact member for connecting the power mechanism to the receiving member.

12. In a stacking apparatus, a movable stack-receiving member, means for delivering articles upon their edges to said member, means for testing a dimension of the stack at one side thereof, and means governed by the testing means for moving the receiving member.

13. In a stacking apparatus, a movable stack-receiving member, means for delivering articles to said member, a testing member movable toward and from the stack, power mechanism, and means governed as a result of stopping the movement of the testing member by the stack for applying power to the receiving member.

14. In a stacking apparatus, a movable stack-receiving member, a movable member delivering to the receiving member, a measuring member movable in timed relation with the delivering member toward and from the stack, a connecting device arranged to be set in the movement of the measuring member, and means for applying power through the connecting device to the receiving member in accordance with the setting.

15. In a stacking apparatus, a movable stack-receiving member, a rotatable member delivering to the receiving member, a stack-measuring member, means rotatable with the delivering member for moving the measuring member toward and from the stack, a connecting device joined to the receiving member and arranged to be set under the influence of the measuring member, and means rotatable with the delivering member and arranged to move the connecting device in accordance with its setting.

16. The combination with a receiving conveyor, of an abutment carried thereby, means for delivering articles against the abutment, a testing member movable toward and from the abutment, and means for advancing the conveyor under the control of the testing member.

17. The combination with a receiving conveyor, of an abutment carried thereby, means for delivering articles against the abutment, a reciprocatory slide, a testing member yieldably mounted upon the slide and co-operating with the abutment, and a connecting device for the conveyor arranged to be set by the testing member as a result of its yield.

18. The combination with a rotatable support, of an conveyor operating over the support, a clutch connected to the support, means for delivering articles to the conveyor, a member movable toward and from each article after delivery, connections to the member for setting the clutch, and means for driving the support through the clutch from the set position.

19. The combination with a rotatable support, of a conveyor operating over the support, a clutch connected to the support, means for delivering articles to the conveyor, a member movable toward and from each article after delivery, connections to the member for setting the clutch, and connections operable upon the delivery of each article for applying power to the set clutch.

20. The combination with a series of revoluble fingers, of a movable abutment against which the fingers successively deliver articles, a series of projections one for each finger revoluble therewith, a member movable by the projections into co-operation with the articles after their delivery, and means for moving the abutment under the control of the member.

21. The combination with a series of revoluble fingers, of a conveyor carrying an abutment against which the fingers successsively deliver articles in a stack, a rotatable support for the conveyor, a clutch connected to the support, a series of projections one for each finger revoluble therewith, a slide movable by the projections, a stack-testing member yieldable upon the slide, connections to the member arranged to move an element of the clutch in one direction, and connections operable by the projections for moving said clutch element in the opposite direction.

In testimony whereof I have signed my name to this specification.

SIDNEY J. FINN.